United States Patent [19]
Fromme

[11] 3,826,351
[45] July 30, 1974

[54] TRAY CONVEYOR
[75] Inventor: Hans-Georg Fromme, Wetzlar, Germany
[73] Assignee: Firma Fromme GmbH., Wetzler, Germany
[22] Filed: Mar. 15, 1972
[21] Appl. No.: 234,890

[30] Foreign Application Priority Data
Aug. 9, 1971  Germany............................ 0213979

[52] U.S. Cl............................................ 198/127 R
[51] Int. Cl............................................ B65g 13/02
[58] Field of Search................ 198/127 R, 181, 182; 193/35 R

[56] References Cited
UNITED STATES PATENTS
| | | | |
|---|---|---|---|
| 1,650,037 | 11/1927 | Phillips............................ | 198/127 R |
| 2,109,925 | 3/1938 | Mitchell............................ | 193/37 X |
| 3,026,993 | 3/1962 | Penn................................ | 198/127 R |
| 3,650,375 | 3/1972 | Fleischauer....................... | 198/127 R |

FOREIGN PATENTS OR APPLICATIONS
| | | | |
|---|---|---|---|
| 980,018 | 1/1965 | Great Britain....................... | 193/37 |

Primary Examiner—Richard A. Schacher
Assistant Examiner—Douglas D. Watts
Attorney, Agent, or Firm—Otto John Munz

[57] ABSTRACT

A tray conveyor supports the trays and laterally guides them, as well as propels them by flanged wheels mounted on the ends of transverse shafts which are driven through cross-belt drives from a longitudinal main drive shaft. In the bend sections, the conveyor line has its transverse shafts inclined and provided with smaller diameter flanged wheels on their inner end, thus maintaining the same conveying plane, while causing the trays to move along a curved path.

3 Claims, 3 Drawing Figures

PATENTED JUL 30 1974 3,826,351

TRAY CONVEYOR

BACKGROUND OF THE INVENTION

1. Field of the Invention

The invention relates to an automatic luggage handling system for air-terminals, employing individual trays for the luggage and to tray conveyors, where the trays are propelled forward by drive rollers which are arranged in the conveyor path.

2. Description of the Prior Art

In the prior art are known tray conveyors equipped with drive rollers, directly or indirectly connected with belt pulleys which are arranged on horizontal transverse shafts underneath the drive rollers. The transverse shafts themselves are interconnected by means of belt drives and driven by motors arranged at certain intervals. Alternatively, the lower belt pulleys are arranged on longitudinal shafts which are connected end-to-end with one another and are driven by a single motor.

The drive rollers which may take the form of large-surface rollers or narrow drive disks engage the trays on their bottom surfaces. In order to improve the drive engagement, it has been proposed to provide on the tray bottoms roughened surface portions which are engaged by drive disks, or a high-friction coating is applied on these surface portions. The drive rollers may also be provided with a rubber tread in the manner of automobile tires.

At high conveying speeds, precautions are necessary in the bend sections of the conveyor to avoid the ejection of trays, especially when they carry loose, shifting loads such as suitcases, handbags and the like. For this purpose, some known systems include lateral guide planks which engage the side walls of the trays. Other devices provide horizontal guide wheels on the bottom of each tray, whereby these wheels engage a special track arranged alongside the conveyor line.

Thus, the lateral guidance of the trays, especially when rollers on each of hundreds of trays are necessary, is complicated and costly, and considerable savings are possible through improvements in this area, especially when large systems are involved.

SUMMARY OF THE INVENTION

The objects of the invention are:

to provide means for a speedy, dependable and safe air-terminal luggage handling system, which is noiseless and requires a minimum of maintenance and supervision;

to provide such a system for a plurality of variously spaced luggage check-in and distribution stations for continuously varying time schedules of airplane departures and arrivals, with a changing amounts and sizes of luggage involved;

to provide such a system capable of assembly and enlargements in widely diverging layouts of airports of different concepts and different developments throughout the world;

to provide for modular assembly purposes components of the system in simple standardized shapes and sections, easily connected with each other and which do not damage the trays to be conveyed, and which function properly, the many required bends, junctions, various relative elevations and numerous routing combinations and varying demands upon them, notwithstanding;

to provide a high speed wheel conveyor in modular construction with a maximum degree of standardization of the individual modules capable of meeting the above requirements;

and to provide an improved tray for the individual pieces of luggage suitable for the objects outlined above;

to provide the conveyor described, having a drive shaft running along the entire installation, capable of being driven by any number of electric motors, having drive wheels of differing diameters to control the traveling speed in acceleration and deceleration sections.

BRIEF DESCRIPTION OF THE DRAWING

Other features and advantages of the invention will become apparent from the following description when taken together with the accompanying drawings which illustrate, by way of an example, an embodiment of the invention, represented in the various figures as follows.

Figure 1:
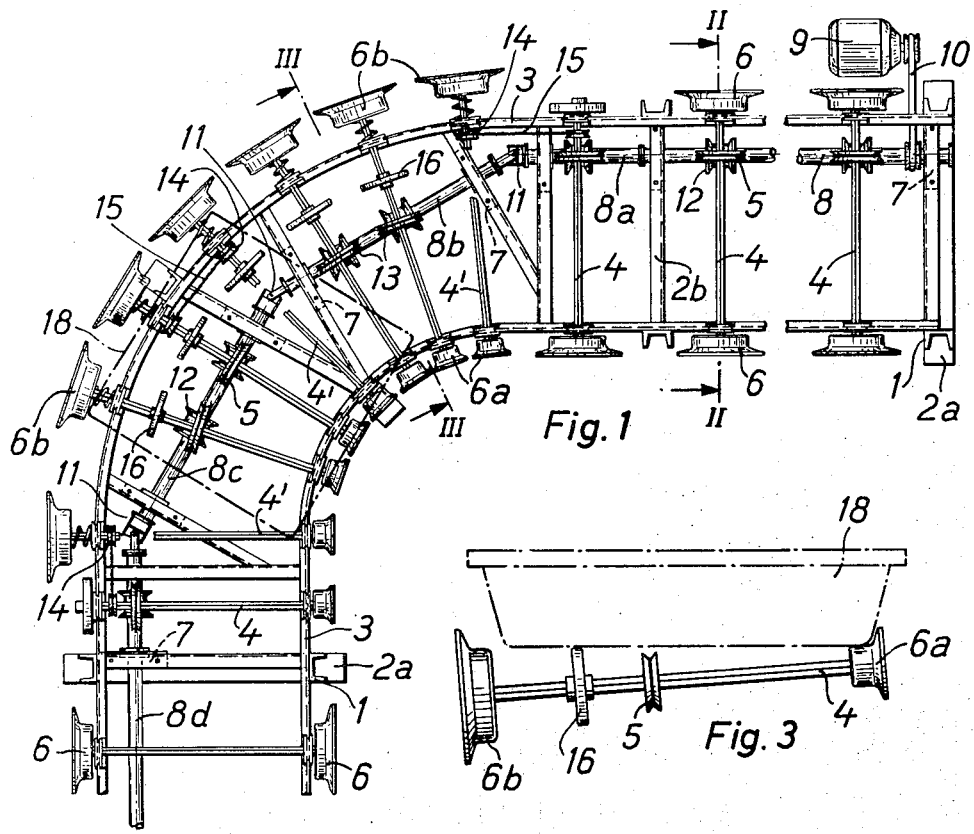
FIG. 1 shows in plan view a bend section of a conveyor system embodying the invention.
Figure 3:
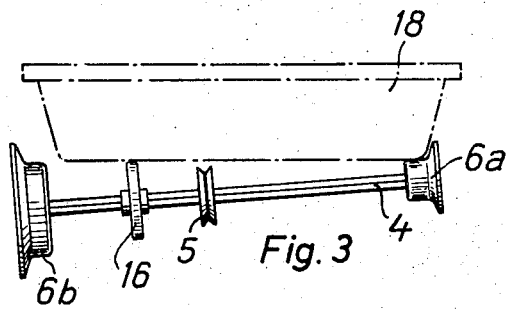
FIG. 3 shows a less enlarged cross-section through the curved portion of the conveyor line of FIG. 1, for example, along line III—III thereof.
Figure 2:
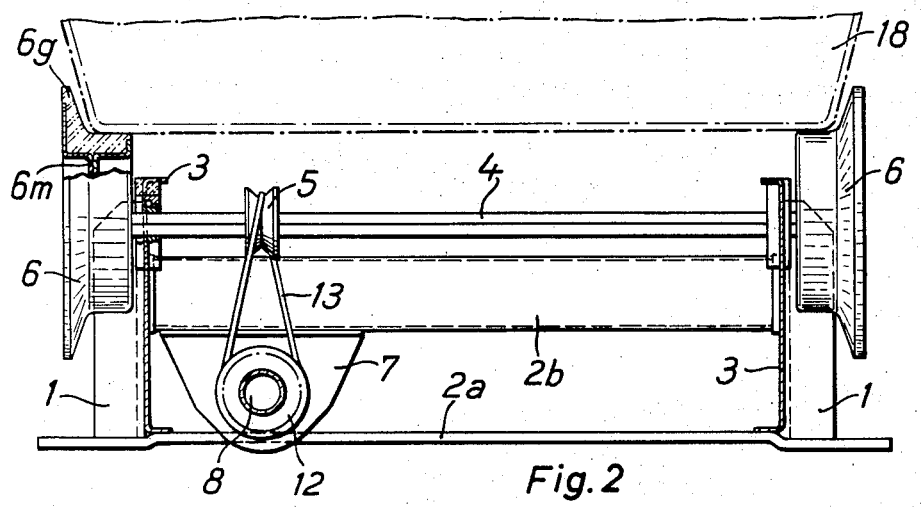
FIG. 2 shows a greatly enlarged cross-section through a straight portion of the conveyor line shown in FIG. 1, for example, along line II—II thereof.

The scale of the drawing is such that it represents an example of operational dimensional relationships.

DESCRIPTION OF THE PREFERRED EMBODIMENT

The invention, in order to attain this objective, provides in combination a tray conveyor, having the drive rollers of the transverse shafts in the form of flanged wheels with the wheel flanges facing to the outside of the conveyor and arranged at such an axial distance that they guide the trays between them.

Preferably, the flanged wheels are arranged outside the longitudinal frame profiles of the conveyor, permitting arrangement of the belt pulleys likewise on the outside for easy repair access, in the case where the pulleys are rigidly connected with the drive wheels. This kind of arrangement results in a conveyor which is barely larger than the trays themselves.

The transverse shafts carrying the flanged drive wheels may have a polygonal cross-section and the belt pulleys may be arranged on these shafts between the frame profiles of the conveyor. These belt pulleys are driven via round belts by transversely oriented drive pulleys mounted on a longitudinal drive shaft. It is preferable to choose such a diameter and distance for the flanged wheels that a single tray is carried by no more than three wheels simultaneously.

In the bend sections of the conveyor, the flanged wheels of the outer side have a diameter which is larger than the diameter of the wheels on the inner side. In order to accomodate this difference, the transverse shafts are inclined at an angle to the horizontal plane, so that the carrying level defined by the outer and inner flanged wheels remain in horizontal alingment with the straight conveyor sections.

The lateral distance between cooperating pairs of flanged wheels is larger in the bend sections than in the straight section as necessitated by the diagonal dimensions of the trays, when they travel through the bend section. In this case, it may be advisable to provide additional supporting wheels on the inclined shafts.

The above-described driving arrangement, where all the shafts are driven via belts from a longitudinal drive shaft also permits the arrangement of only one flanged wheel on each transverse shaft, on alternating sides for adjacent shafts, thereby offering a considerable simplification and saving in cost at an unchanged operational efficiency.

The conveyor system of the invention has a conveyor frame including vertical support profiles 1 which carry two longitudinal frame profiles 3 with transverse connecting members 2a and 2b. A plurality of transverse shafts 4 are journalled in the longitudinal profiles 3. The typical shaft 4 has a hexagonal cross-section and carries an axially movable belt pulley 5 between the longitudinal profiles 3 and on each shaft end, outside the profiles 3, a flanged wheel 6. The oppositely arranged flanged wheels 6 carry and propel the trays 18, while also guiding them laterally. To the connecting members 2a are mounted gussets 7 which include journals for the main drive shaft 8. The latter receives its drive from an electric motor 9, via a belt drive 10. The main shaft 8 is subdivided into several shaft sections 8a, 8b, 8c and 8d which are interconnected by means of universal joints. The main drive shaft 8 thus extends longitudinally through the entire bend section of the conveyor line. The main drive shaft 8 also carries a number of drive pulleys 12, one under each belt pulley 5. A round belt 13 connects each drive pulley with the corresponding belt pulley. The drive pulleys 12 are frictionally engaged by the drive shaft 8, in order to provide a smooth drive and an overload safety.

Each of the flanged wheels 6 includes a metal rim 6m on which is mounted a rubber profile 6g representing the carrying surface and guide flange of the wheel. In the bend section of the conveyor, the flanged wheels 6 are spaced further apart on their shafts to accommodate the diagonal dimensions of the trays 18. In addition, the inner wheel 6a of each pair of flanged wheels has a smaller diameter than the outer wheel 6b. Thus, the inner wheels 6a tend to decelerate the moving trays on their inner side, while their outer side continues to move at the same velocity, thereby gently but firmly causing the tray 18 to move in a curve as indicated in FIG. 1, without bumping against the outer flanged wheels 6b.

In places where a universal joint on the main drive shaft 8 coincides with the position of a transverse shaft 4, it may be impossible to arrange a drive pulley 12 on the main shaft 8. In such cases, the transverse shafts 4' carry a special belt pulley 14 over which they are driven, via a belt 15, from an adjacent transverse shaft 4.

Due to the geometric configuration of the trays 18 and the transverse shafts 4 in the bend section, the trays may not always be in supporting contact with at least two outer flanged wheels 6b. The inclined transverse shafts 4 of this portion of the conveyor line therefore carry additional supporting wheels 16 to support the trays near their outer margin.

The specific design of the conveyor contributes to the inventive automation of the luggage handling system.

In the luggage collecting buffer zone, the first container is mechanically stopped. Because the drive wheels cannot slip under the stopped container, the belt drive pulleys slip on the drive shaft. For this purpose, they are made of a wear-resistant special plastic material.

The straight conveyor sections of the installation are produced advantageously in a standardized length of 3,000 mm. The radius of the horizontal bend sections is 1,000 mm., or 3,000 mm, respectively, and all vertical curves have a standardized inner radius of 5,000 mm. Standardized inclines are 20°, but steeper angles can be obtained, where necessary. Assembly of the modular units is extremely simple: the separate conveyor sections are bolted together, and the drive shafts are connected end-to-end by means of chain couplings. The conveyor may be installed, according to preference, directly on the ground, on top of supporting legs, or even suspended from the ceiling of a building.

I claim:

1. A high-speed conveyor system for the conveyance of trays and like objects, comprising in combination:
    a stationary elongated conveyor frame, including at least one longitudinal frame member on each side thereof;
    a succession of transverse drive shafts extending across the frame members at regular longitudinal intervals, the shafts being rotatably supported between the frame members;
    at least one extremity of each drive shaft including a shaft extension reaching outside the supporting frame member;
    a succession of flanged drive wheels mounted on the shaft extensions outside the frame members in such a way that a row of drive wheels is provided on each side of the conveyor with their flanges facing away from each other, the flanged drive wheels thereby providing successive points of support and frictional drive for a flat-bottomed object such as a tray, as well as lateral guidance therefor;
    a longitudinal main drive shaft arranged between the frame members underneath the transverse drive shafts;
    a succession of drive pulleys mounted on the main drive shaft in a first axial alignment with the transverse shafts;
    and a driven pulley on each transverse drive shaft, with a belt connecting it to the corresponding drive pulley;
    wherein
    the transverse drive shafts have a non-circular profile, the flanged drive wheels and the driven pulleys mounted thereon having matching bores for rotational engagement therewith;
    the driven pulleys are axially movable on their drive shafts; and
    the driving means further includes a frictional override connection between the main drive shaft and at least some of the flanged drive wheels.

2. A conveyor system as claimed in claim 1, wherein the frictional override connection of the driving means is arranged between the main drive shaft and the drive pulleys mounted thereon.

3. A high speed conveyor system, comprising in combination:
    a stationary elongated conveyor frame, including at least one longitudinal frame member on each side thereof;

a succession of transverse drive shafts extending across the frame members at regular longitudinal intervals, the shafts being rotatably supported between the frame members;

at least one extremity of each drive shaft including a shaft extension reaching outside the supporting frame member;

a succession of flanged drive wheels mounted on the shaft extensions outside the frame members in such a way that a row of drive wheels is provided on each side of the conveyor with their flanges facing away from each other, the flanged drive wheels thereby providing successive points of support and frictional drive for a flat-bottomed object such as a tray, as well as lateral guidance therefor;

means for simultaneously driving at least a group of transverse drive shafts; wherein the conveyor frame includes straight-line sections, and bend sections, the longitudinal frame members of a bend section being curved to define an inner frame member and an outer frame member;

the transverse drive shafts in a bend section are arranged substantially perpendicular to the curved frame members;

the flanged drive wheels on the outer drive shaft extensions of the bend sections are positioned a greater distance from the outer frame member than the corresponding wheels of a straight-line frame section; wherein the flanged drive wheels on the inner shaft extensions of a bend section are smaller than the flanged drive wheels on the outer shaft extensions, so as to impart a curvilinear motion to objects supported and driven by these wheels;

the transverse drive shafts in a bend section are arranged at an incline so as to maintain the support and drive points of the inner and outer flanged drive wheels in alignment with the support and drive points of the flanged drive wheels of an adjacent straight-line conveyor section; wherein the driving means in a straight-line section includes:

a longitudinal main drive shaft for each straight-line conveyor section arranged between the frame members underneath the transverse drive shafts;

a succession of drive pulleys mounted on the main drive shaft in alignment with the transverse shafts; and driven pulleys on the transverse drive shafts, with belts connecting them to the drive pulleys; and the driving means in a bend section including:

at least one short main drive shaft coupled to the main drive shaft of the adjoining straight-line section at an angular offset thereto and connected to a limited number of drive shafts in the bend section in the same manner as called for in the straight-line section;

several successively coupled and angularly of set main drive shafts being arranged in a bend section which covers an angle that is greater than twice the angular offset between the short main drift shaft and an adjacent longitudinal main drive shaft of a straight-line section.

* * * * *